United States Patent [19]
Richard

[11] Patent Number: 6,052,877
[45] Date of Patent: Apr. 25, 2000

[54] PET BURIAL CONTAINER

[75] Inventor: Theresa Richard, Pilot Mound, Canada

[73] Assignee: Creature Wares Ltd., Pilot Mound, Canada

[21] Appl. No.: 08/863,130

[22] Filed: May 27, 1997

[51] Int. Cl.[7] .................................................. A61G 17/00
[52] U.S. Cl. ...................................................... 27/1; 27/35
[58] Field of Search ............................. 27/1, 35, DIG. 1, 27/28; 5/628, 629, 413 R

[56] References Cited

U.S. PATENT DOCUMENTS

| | | |
|---|---|---|
| 2,788,530 | 4/1957 | Ferguson ..................................... 5/628 |
| 3,842,454 | 10/1974 | Young . | 
| 5,005,784 | 4/1991 | Harden ....................................... 27/1 X |
| 5,061,235 | 10/1991 | Hogan ....................................... 5/629 X |
| 5,211,186 | 5/1993 | Shoemaker et al. ......................... 5/628 |
| 5,282,439 | 2/1994 | Oaks .......................................... 27/2 X |
| 5,341,548 | 8/1994 | Zerick ....................................... 27/1 X |

FOREIGN PATENT DOCUMENTS

| | | |
|---|---|---|
| 2546748 | 12/1984 | France . |
| 4020711 | 1/1992 | Germany . |
| 102337 | 8/1963 | Norway . |

*Primary Examiner*—Michael F. Trettel
*Assistant Examiner*—William L. Miller
*Attorney, Agent, or Firm*—Adrian D. Battison; Murray E. Thrift

[57] ABSTRACT

A container for burial of a deceased pet is described. The pet burial container comprises a fabric bag and a flat sheet. The fabric bag comprises a base arranged to accept the flat sheet therein and a flaccid top portion opposite the base. The deceased pet is placed into the fabric bag such that the deceased pet rests on the flat sheet while the flaccid top portion drapes over the deceased pet, thereby enclosing the deceased pet in the fabric material.

2 Claims, 4 Drawing Sheets

PET BURIAL CONTAINER

BACKGROUND OF THE INVENTION

A traumatic event for anyone is the death of a beloved pet. Typically, the burial process involves placing the deceased pet in an appropriately sized box, such as a shoe box or other cardboard box or, more typically, the deceased pet is placed in a plastic garbage bag or old blanket and then simply buried. This, however, is obviously an inadequate and undignified tribute for a cherished family member. Clearly, a more suitable pet burial container is needed.

SUMMARY OF THE INVENTION

It is one object of the invention, therefore, to provide a pet burial container.

According to a first aspect of the invention, there is provided a pet burial container comprising:
a stiffening element comprising:
 a flat sheet for supporting a deceased pet thereon; and
a fabric bag comprising:
 a base arranged to accept the stiffening element;
 sides extending upwards from the base;
 a flaccid top portion free of handles, said flaccid top portion arranged to be opposite the base;
 an interior portion located between the top portion and the base for storing the deceased pet therein; and
 an opening for accessing the interior portion of the fabric bag, said opening including a closure for closing the fabric bag,
wherein the sole support means for carrying the pet burial container is the flat sheet. After the fabric bag is opened, the deceased pet is placed into the interior portion of the fabric bag such that the deceased pet is supported on the flat sheet. In this arrangement, the flaccid top portion drapes over the deceased pet, thereby enclosing the deceased pet in the fabric material. The fabric bag is then closed and the pet burial container is transported to the burial site. Of note is that is that in this aspect of the invention, the pet burial container lacks handles. As a result of this handle-less arrangement, the pet burial container is carried by supporting the pet burial container from the base of the fabric bag, that is, from below the deceased pet.

The closure may comprise a strip. The flat sheet may comprise sides and rounded edges.

Preferably, the opening is adjacent to the base such that the opening is arranged to be on one side of the fabric bag. The sides may be gathered so that the top portion fits loosely opposite the base.

According to a second aspect of the invention, there is provided a pet burial container comprising:
a stiffening element comprising:
 a flat sheet for supporting a deceased pet thereon; and
a fabric bag comprising:
 a base arranged to accept the stiffening element;
 sides extending upwards from the base;
 handles extending laterally from the base for carrying the pet burial container by the base of the fabric bag;
 a flaccid top portion free of handles, said flaccid top portion arranged to be opposite the base;
 an interior portion located between the top portion and the base for storing the deceased pet therein; and
 an opening for accessing the interior portion of the fabric bag, said opening including a closure for closing the fabric bag. After the fabric bag is opened, the deceased pet is placed into the interior portion of the fabric bag such that the deceased pet is supported on the flat sheet. In this arrangement, the flaccid top portion drapes over the deceased pet, thereby enclosing the deceased pet in the fabric material. The fabric bag is then closed and the pet burial container is transported to the burial site. Of note is that is that the flaccid top portion of the fabric bag is free of handles. However, in this aspect of the invention, the fabric bag includes handles extending from the base for carrying the pet burial container. Thus, the pet burial container is carried by the handles adjacent to the base of the fabric bag, that is, from below the deceased pet.

The closure may comprise a strip. The flat sheet may comprise sides and rounded edges.

Preferably, the opening is adjacent to the base such that the opening is arranged to be on one side of the fabric bag. The sides may be gathered so that the top portion fits loosely opposite the base.

According to a third aspect of the invention, there is provided a method for burying a deceased pet comprising:
providing a flat sheet for supporting the deceased pet thereon;
providing a fabric member comprised of a taut portion attached to the flat sheet and a flaccid portion;
placing the deceased pet on the flat sheet and draping the flaccid portion of the fabric member over the deceased pet; and
carrying the deceased pet to the burial site by supporting the flat sheet from beneath the deceased pet. The deceased pet is placed on the flat sheet and the flaccid portion of the fabric member is draped over the deceased pet so that the deceased pet is enclosed in fabric. The deceased pet is then carried to the burial site by supporting the flat sheet from beneath the deceased pet.

The flat sheet may comprise sides and rounded edges.

DETAILED DESCRIPTION

Figure 1:
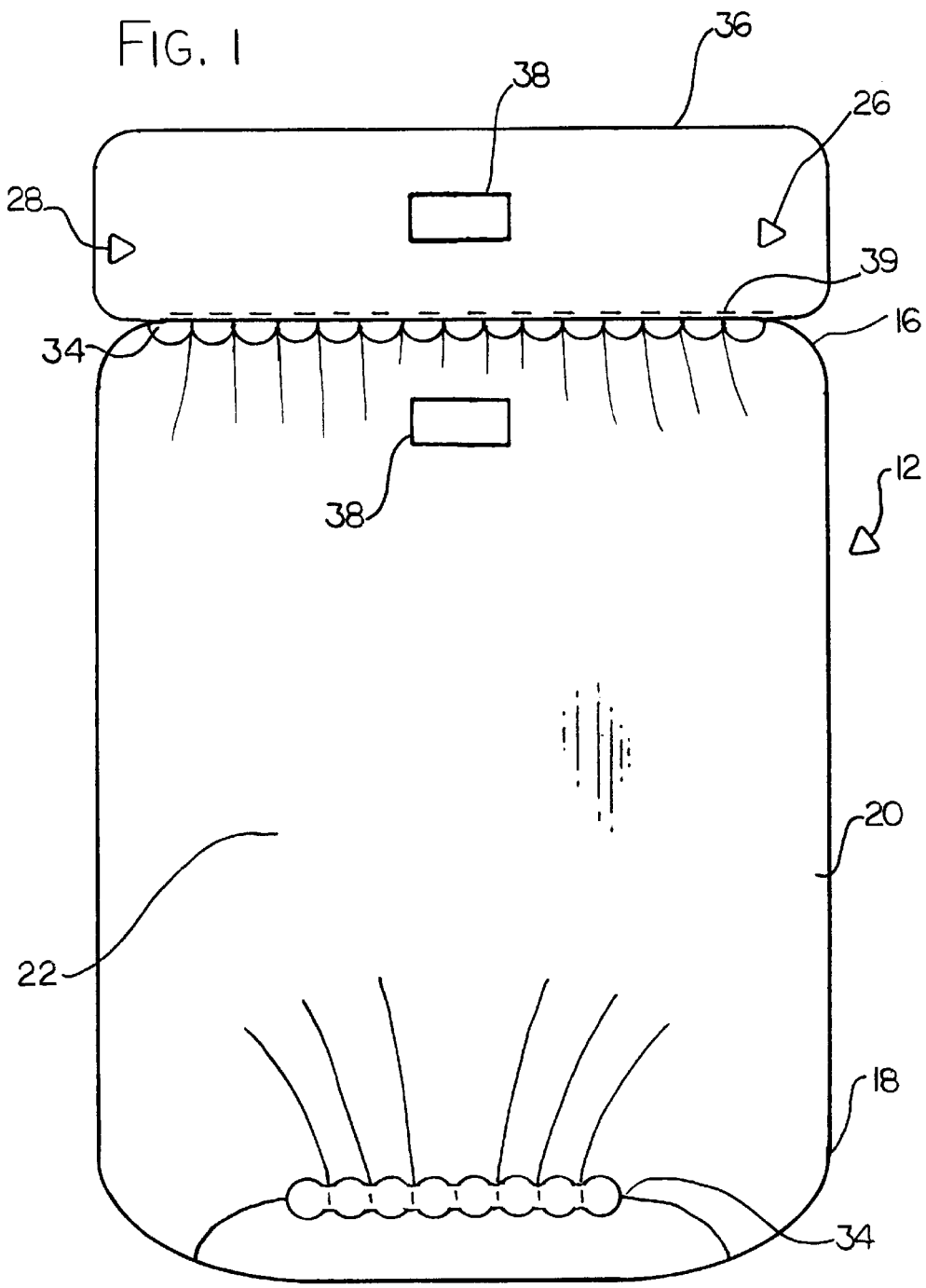
FIG. 1 is a top plan view of the pet burial container.

Referring to the figures, a pet burial container 1 comprises a stiffening element 10 and a fabric bag 12.

The stiffening element 10 comprises a flat sheet 14. In this embodiment, the flat sheet 14 has rounded edges 16 and is arranged to be inserted into the fabric bag 12 as described below.

Figure 4:
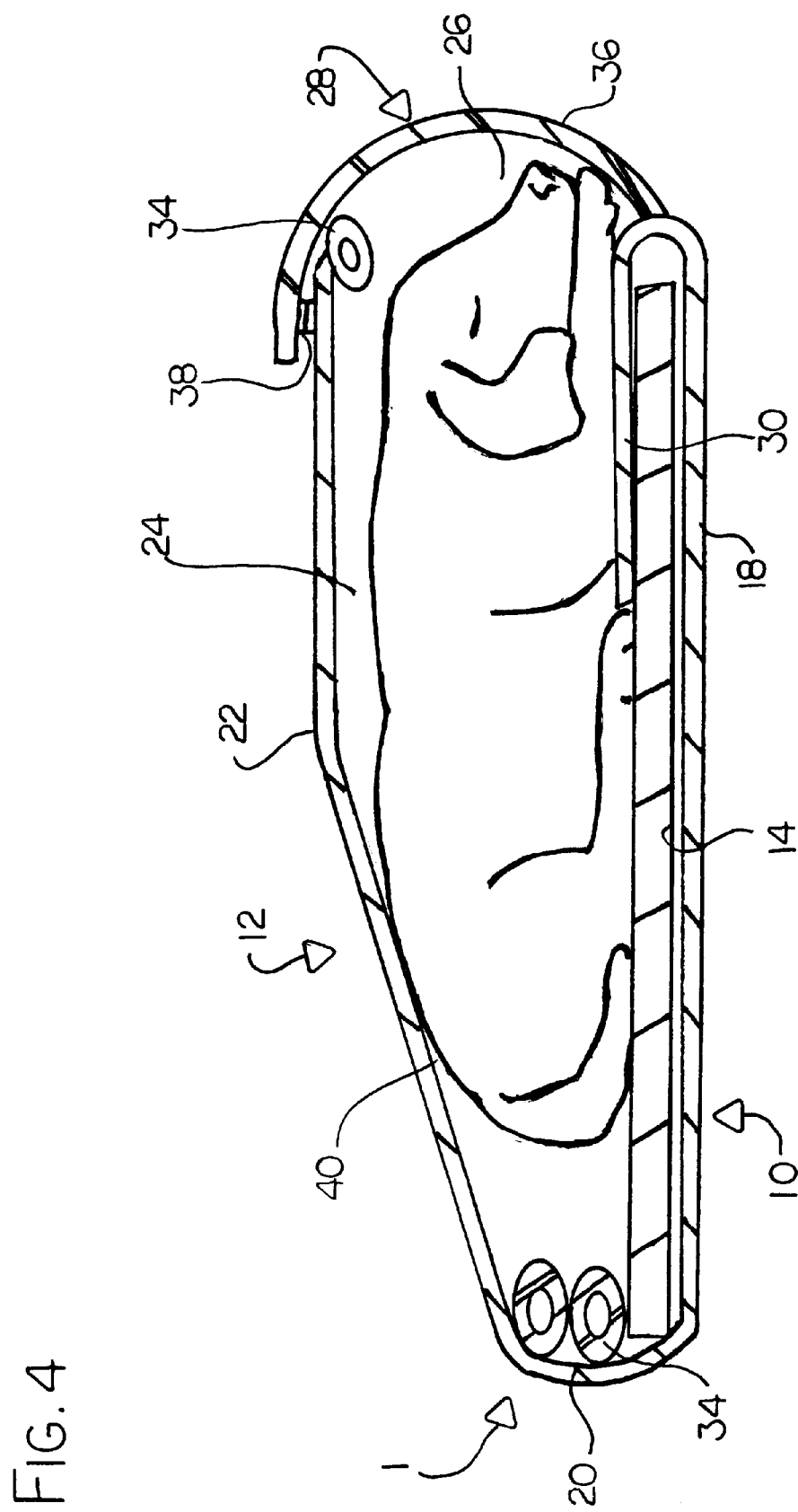
FIG. 4 is a longitudinal cross-section view of the pet burial container.

The fabric bag 12 comprises a base 18, sides 20, a flaccid top portion 22, an inner portion 24, an opening 26 and a closure 28. The base 18 is arranged to accept the flat sheet 14 therein such that the base 18 fits tightly around the flat sheet 14. Specifically, the base 18 includes a pocket 30 for inserting a portion of the flat sheet 14 therein as shown in FIG. 4. As a result of this arrangement, the base 18 of the fabric bag 12 is rigid and may support a deceased pet thereon, as described below. The flat sheet 14 is secured within the base 18 by a series of stitches surrounding the flat sheet 14. Alternatively, the stiffening element 10 may be attached to the base 18 of the fabric bag 12 by other means. The sides 20 are connected to the base 18 by a series of stitches arranged to be adjacent to the series of stitches surrounding the flat sheet 14. The sides 20 are arranged to include elastics 34 at positions proximal to the base 18 such that the sides 20 are gathered. As a result of this arrangement, the flaccid top portion 22 fits loosely above the base 18. Of note is that the flaccid top portion 22 is free of handles. The opening 26 provides access to the inner portion 24 of the fabric bag 12. In this embodiment, the opening 26 is adjacent to the base 18 such that the opening 26 is at one of the sides 20 of the fabric bag 12. Alternatively, the fabric bag 12 may be arranged such that the opening 26 is, for example, at the flaccid top portion 22 of the fabric bag 22. Furthermore, the opening 26 is arranged to include a closure 28 for closing the fabric bag. In this embodiment, the closure 28 comprises a flap 36 arranged to fit over the opening 26 and a strip 38 for closing the flap 36. The flap 36 is connected to the fabric bag 12 by a series of stitches 39 as shown in FIG. 1.

In operation, the fabric bag 12 is opened at the opening 26, thereby allowing access to the inner portion 24 of the fabric bag 12. Next, a deceased pet 40 is placed into the inner portion 24 of the fabric bag 12 such that the deceased pet 40 lies on the flat sheet 14 inserted into the base 18 of the fabric bag 12. As noted above, the sides 20 are gathered so that the flaccid top portion 22 fits loosely opposite the base 18; thus, the flaccid top portion 22 drapes over the deceased pet 40, thereby enclosing the deceased pet 40 in fabric material. The closure 28 is then used to close the fabric bag 12 by fitting the flap 36 over the opening 26 and closing the fabric bag 12 with the strip 38 so that the deceased pet 40 is now held within the pet burial container 1. As noted above, the flaccid top portion 22 of the fabric bag 12 is free of handles. As a result of this arrangement, the pet burial container 1 is carried at the base 18 of the fabric bag 12 by supporting the flat sheet 14 from beneath the deceased pet 40. That is, the pet burial container 1 is carried from below the deceased pet 40 by the base 18 of the fabric bag 12. Thus, the deceased pet 40 is carried to the burial site much as one would carry a pillow or similar object.

Figure 2:
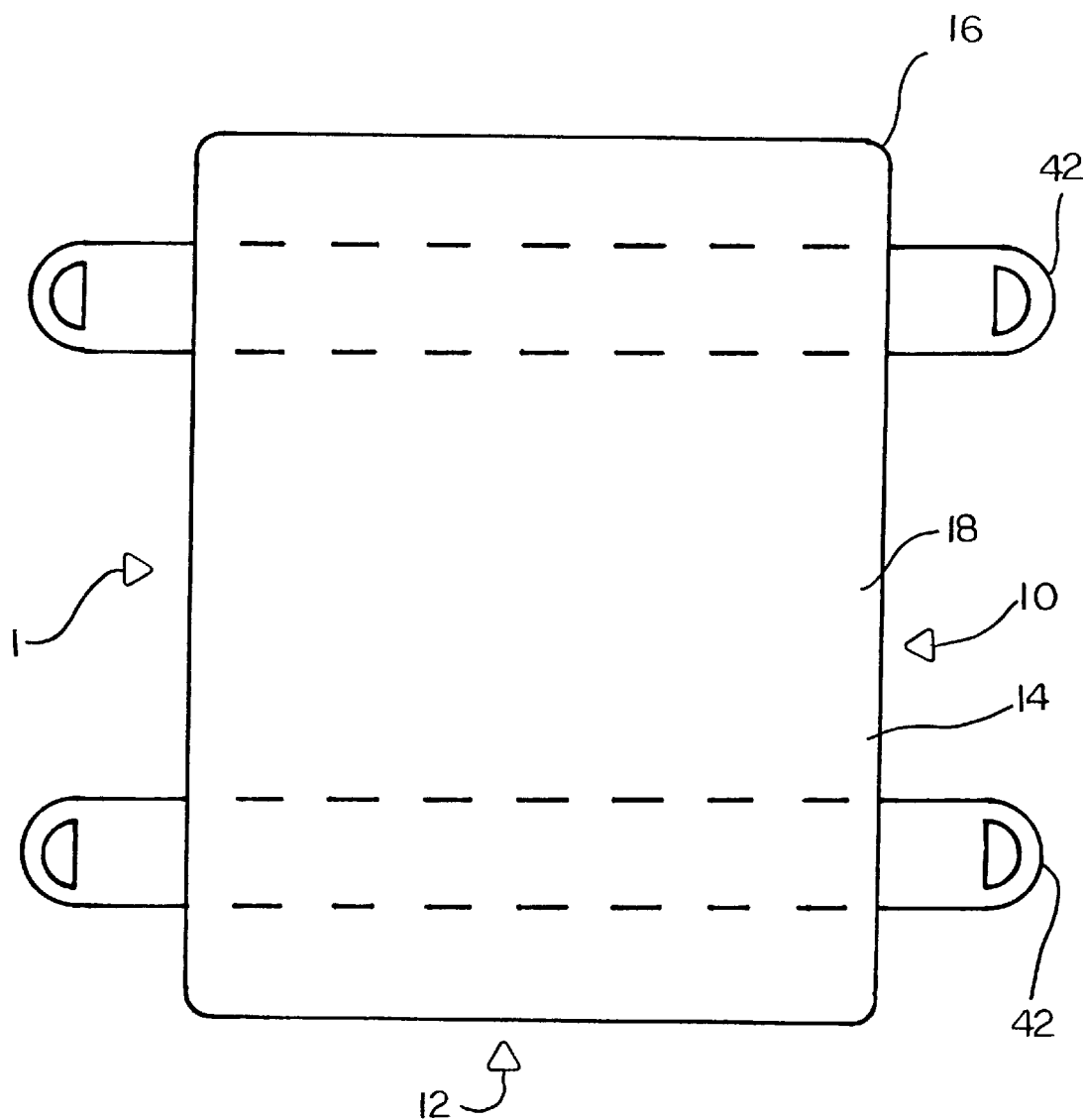
FIG. 2 is a bottom view of the pet burial container.
Figure 3:
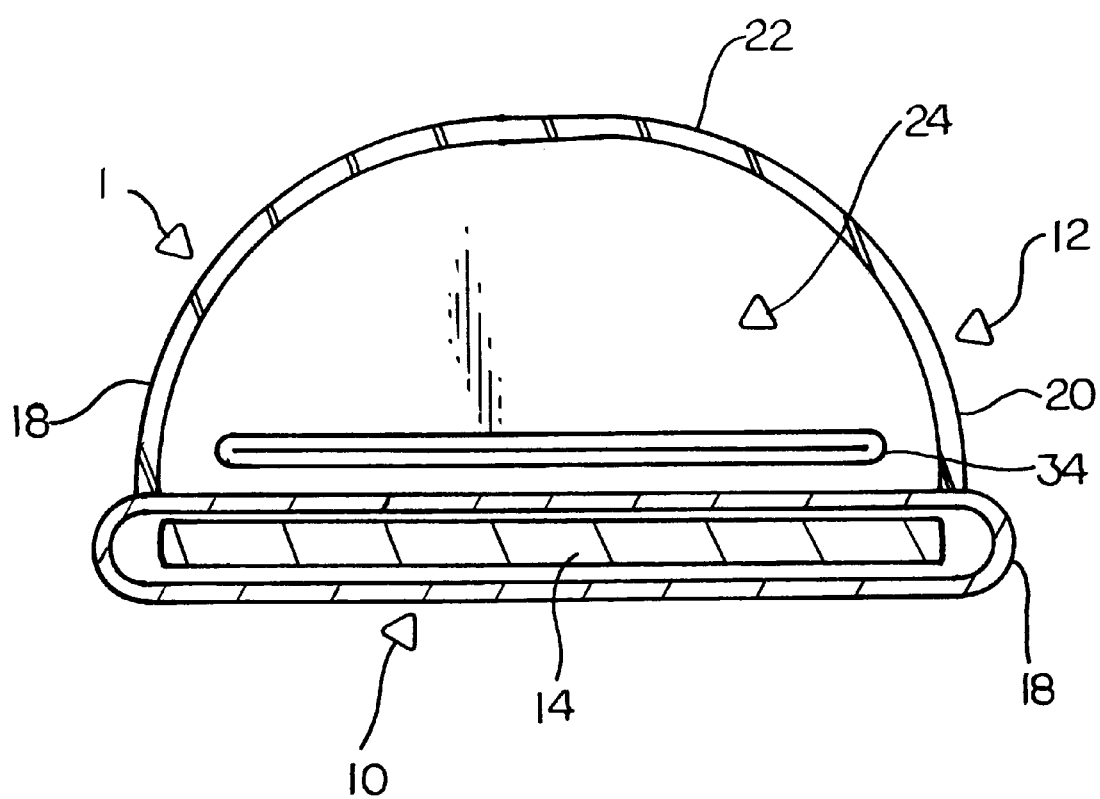
FIG. 3 is a lateral cross-section view of the pet burial container.

In another embodiment, shown in FIG. 2, the pet burial container 1 includes handles 42 extending from the base 18 for carrying the pet burial container 1. Of note is that in this embodiment, the flaccid top portion 22 remains free of handles and the pet burial container 1 is carried from the base 18, that is, from beneath the deceased pet 40. Furthermore, the specific dimensions of the pet burial container 1 and the specific fabric used for construction of the fabric bag 12 may be varied as desired.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method for burying a deceased pet animal comprising:

providing a single flat closed bottom sheet defining edges of the sheet;

providing a single closed top sheet defining edges of the sheet overlying the bottom sheet;

connecting together the top and bottom sheets around the edges to form a substantially closed bag leaving one part of the edges open to form a single opening at said one part of the edges of the bag, the opening at said part of the edges defining the only opening at the top sheet and into the bag;

providing a flat stiffener sheet;

attaching the stiffener sheet to an inside surface of the bottom sheet such that the bottom sheet extends across and is maintained substantially taut relative to a bottom surface of the stiffener sheet;

the closed top sheet being connected to the bottom sheet around the edges thereof such that the closed top sheet is loose and flaccid relative to the stiffener sheet;

inserting the animal into the container bag through the opening at said one part of the edges of the bag, such that the animal is inserted underneath the closed top sheet from the edge thereof with the closed top sheet being sufficiently loose and flaccid to allow the insertion thereunder of the animal and such that the animal is supported by the stiffener sheet;

the stiffener sheet being sufficiently stiff so as to remain substantially flat while the animal is supported upon the stiffener sheet;

arranging the top sheet to be sufficiently flaccid and loose such that the top sheet is draped loosely over the animal while supported on the stiffener sheet;

closing the opening such that the animal is fully enclosed;

transporting the animal in the container bag by supporting the bag from underneath the stiffener sheet;

and burying the animal in the bag.

2. The method according to claim 1 wherein the bag is free from handles and the bag is transported by a user by engaging the hands of the user underneath a bottom surface of the bottom sheet to transfer forces to the bottom of the stiffener sheet.

* * * * *